United States Patent [19]

Weiss et al.

[11] Patent Number: 4,733,743
[45] Date of Patent: Mar. 29, 1988

[54] DRIVING ARRANGEMENT FOR A TRACK-ADJUSTABLE MOTOR VEHICLE BEARING AXLE HAVING SELECTIVELY DRIVABLE WHEELS

[75] Inventors: Heinz Weiss, Bensheim; Herbert Gelb, Hockenheim, both of Fed. Rep. of Germany

[73] Assignee: Deere & Company, Moline, Ill.

[21] Appl. No.: 941,248

[22] Filed: Dec. 12, 1986

[30] Foreign Application Priority Data

Dec. 12, 1985 [DE] Fed. Rep. of Germany ....... 3543871

[51] Int. Cl.⁴ .............................................. B60K 17/30
[52] U.S. Cl. ...................................... 180/255; 180/76; 192/48.3; 192/50
[58] Field of Search ................... 180/233, 252, 255, 76, 180/906; 192/48.3, 48.1, 49, 50

[56] References Cited

U.S. PATENT DOCUMENTS

| | | | |
|---|---|---|---|
| 1,438,051 | 12/1922 | Moakler | 180/76 X |
| 2,598,876 | 6/1952 | Ash | 180/255 |
| 4,482,025 | 11/1984 | Ehrlinger et al. | 180/255 |

FOREIGN PATENT DOCUMENTS

2054492  2/1981  United Kingdom ................ 180/255

Primary Examiner—John A. Pekar

[57] ABSTRACT

A driving arrangement for selectively drivable wheels of a motor vehicle has, in or on an adjustable bearing axle, telescopic input shafts connected at one end to a direction-changing gear and at the other end to an input shaft for a spur gearing in a swivel housing. A clutch engaging and disengaging in dependence upon relative rotation between the wheels and the input shaft is connected between the spur gearing and the input shaft. This allows catching up of the wheels, while the driving connection to the other wheels is maintained, as well as engine braking.

12 Claims, 8 Drawing Figures

DRIVING ARRANGEMENT FOR A TRACK-ADJUSTABLE MOTOR VEHICLE BEARING AXLE HAVING SELECTIVELY DRIVABLE WHEELS

BACKGROUND OF THE INVENTION

The invention relates to a driving arrangement for selectively drivable wheels of a motor vehicle bearing axle. Many such driving arrangements are known, but each suffers from its own disadvantages.

German Laid-open Pending Patent Application No. 3 407 918 discloses a driving arrangement for a motor vehicle four-wheel drive system with an engageable and disengageable main clutch in the main transmission of a selectively connectable front-wheel drive. Bidirectional free wheel overrunning clutches are provided in the hubs of each of the front wheels. In this way, the usual differential transmission between the drives of the two front wheels can be dispensed with. Instead, only direction changing gearing to convey the rotary driving motion from the main transmission to the hubs of the front wheels is necessary.

The disadvantage inherent in this driving arrangement, however, is that due to the bidirectional free wheel overrunning clutches, the front wheels cannot be braked through the driving connection. For braking purposes, braking elements would have to be provided on the front wheels themselves.

German Laid-open Pending Patent Application No. 3 308 398 provides a differential gear on the inner ends of two input half shafts. This simultaneously allows a differing rolling speed of the wheels driven via the input shafts and ensures driving of the wheels if the differential gear has a higher angular speed than the input shafts extending into it. To this end, the differential has sets of thrust rings with axially oriented intermeshing wedge-shaped teeth. In the event of differing angular speed between the thrust rings, the wedge-shaped teeth establish a connection between the input shaft or shafts and the differential gear via a cone or disc clutch. As soon as a wheel and, consequently, an input shaft, rotates at a higher speed than the differential gear, the frictional connection at the cone or disc clutch is interrupted and the wheel in question can rotate freely.

The main disadvantage of this driving arrangement is that the differential gear occupies a relatively large amount of space. When installed on a bearing axle carrying, for example, the drivable front wheels of a motor vehicle, this results in an undesirable reduction in the ground clearance. Additionally, the necessary large case incurs correspondingly large manufacturing costs.

European Patent Application No. 0 047 942, teaches a housing for a differential gear fixed to a bridge of a track-adjustable front wheel bearing axle or to a bearing bracket receiving the bridge so that it can swing. In a first embodiment, the front wheels are driven via input shafts extending between the differential gear and the wheel center. In a second embodiment, the bearing axle is a portal axle with two bevel gearings enabling adaptation of the driving parts to the profile of a profile axle provided in the drive train to the front wheels.

The first embodiment of this driving arrangement is disadvantageous because the housing and the input shafts extending from it limit the ground clearance of the motor vehicle too greatly, while the second embodiment is too expensive due to the two bevel gears. Moreover, in both embodiments, the front wheels are connected to one another via a conventional differential gear which has the drawback that when travelling on a bend or cornering, it leads to tire wear or ground shearing and, when travelling over ground of varying condition, it cannot transmit any driving force to the still adhering front wheel.

Finally, German Laid-open Pending Patent Application No. 2 930 298 teaches a driving arrangement having an input shaft with an input gear swivellably connected thereto. The input gear, in turn, transmits its rotary motion directly via a spur gearing to a wheel hub holding the corresponding front wheel.

In this driving arrangement, the input shaft extends through a rigid axle body which is not variable in its track width, and consequently cannot be used with bearing axles adjustable to different track widths. On the contrary, the front wheels must be provided with folding or adjustable rims if different track widths are to be set, which eliminates advantages described in the reference arising from the accommodation of the swivelling housing inside the wheel rim.

Furthermore, this driving arrangement has the inherent disadvantage that it needs a differential gear to compensate for the differing speeds of rotation of the two front wheels when travelling on a bend, which leads to a reduction in the ground clearance. Moreover, the differential cannot be adapted to different track widths.

Accordingly, the object of the invention is to provide a driving arrangement for selectively drivable wheels of a motor vehicle bearing axle which achieves optimum traction conditions without limiting the ground clearance of the motor vehicle, and which can also be adjusted to different track widths, as needed.

SUMMARY OF THE INVENTION

According to the present invention, each wheel on a track-adjustable bearing axle is drivable through its own clutch which engages and disengages depending upon torque. The wheels are driven inside swivel housings via a spur gearing and with an overhead input shaft, with the respective clutches in the respectively associated swivel housings. The input shafts are of telescopic construction.

No differential gear case limiting the ground clearance of the motor vehicle is necessary with the present invention and, since the clutches employed in place of the differential gear are accommodated in the swivel housings and the spur gearings employed have a relatively small axial extent, ground clearance is maintained even when the track width is adjusted by means of the track-adjustable bearing axle. Additionally, since the clutches are inside the swivel housings, they stay within the axial extent of the wheel, even if the track-adjustable bearing axle is set to a different track width.

Preferably, the bearing axle has a bridge connected to a housing containing gearing to reverse the drive. Half-axles which support the swivel housings at one end thereof are selectively connectable to the bridge in a plurality of positions transversely of the direction of travel of the motor vehicle. Additionally, the half-axles and/or the bridge preferably have a recess formed therein to accommodate the input shafts. The input shafts are then readily protected against the effects of external forces generated by, e.g., hitting an obstacle.

The input shafts preferably drive input gears at their swivel housing ends, with each of the gears driving the corresponding wheel either through two intermediate gears or directly by a driven gear. A clutch is accommodated in a space-saving manner within the wheel rim, with a driving side part of the clutch connected to the input shaft and a driven side part of the clutch connected to the input gear.

Moreover, according to a further aspect of the invention, the driven side part of the clutch is provided with inner and outer discs and with an axially movable thrust ring having wedge-shaped teeth. The inner discs are connected to the input shaft and the outer discs to the input gear. The driving side part likewise contains a thrust ring with wedge-shaped teeth. The teeth on the two thrust rings will mesh whenever there is relative rotation between the rings. Due to their wedge shapes, the teeth move the thrust ring of the driven side part axially towards the discs whenever they mesh, thereby connecting and disconnecting the drive in a torque-dependent manner.

BRIEF DESCRIPTION OF THE DRAWINGS

An embodiment of the invention will be described in detail hereinafter with reference to the drawings, in which.

DETAILED DESCRIPTION OF THE PREFERRED EMBODIMENTS

Figure 1:
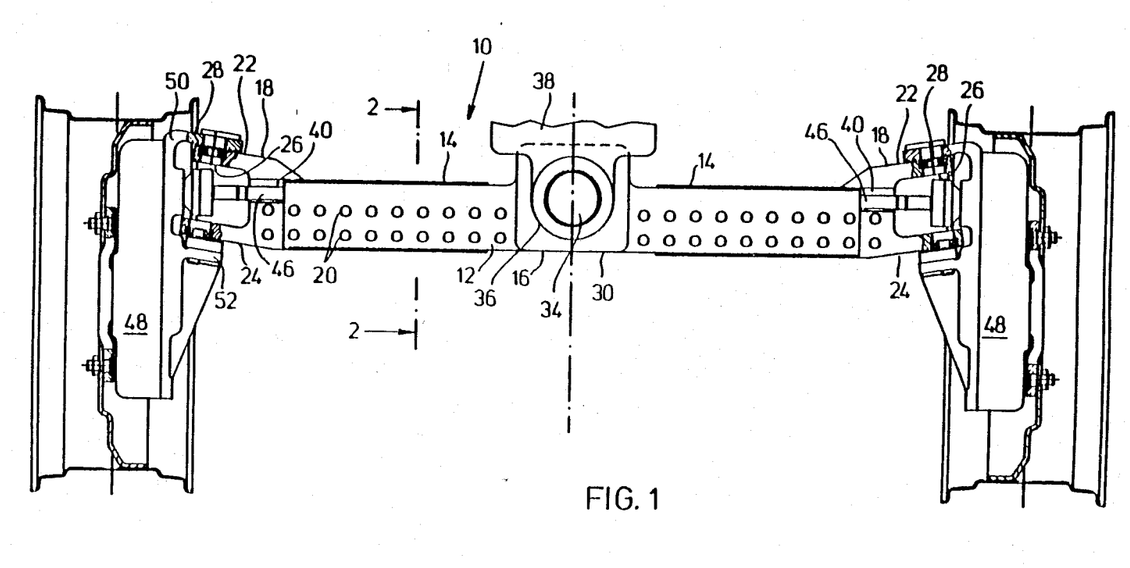
FIG. 1 is a front view of a bearing axle equipped with a driving arrangement according to the invention.

FIG. 1 shows a track-adjustable bearin axle 10 as it can be seen when looking from the front at a motor vehicle (not shown) accommodating the bearing axle 10, e.g., on an agricultural tractor. The bearing axle 10 comprises a bridge 12 and half-axles 14 connected laterally thereto. In this viewing direction, the bridge lies in front of the half-axles 14.

The bearing axle 10 may alternatively be employed at the rear end of a vehicle, in which case it would be used for the rear wheels. The bearing axle 10 may moreover be provided as an axle supplementary to a quite differently designed axle or as a supplementary axle for another identical bearing axle.

Both the bridge 12 and the half-axles 14 have a series of bores 20 of the same pattern and arranged in two approximately horizontally extending rows through which bolts 13 (see FIG. 2) can extend. The bridge 12 and the half-axles 14 can be attached in a large number of positions, so that the bearing axle 10 can be adjusted to different lengths and thereby provide different track widths.

A housing 16 accommodates a direction changing gear (not shown), preferably bevel gearing, on the bearing axle 10. The bridge 12 is of mirror image construction with the housing 16 in its center and preferably is produced in one casting with the housing 16. The bottom of the housing 16 aligns with the bridge 12.

The half-axles 14 are each formed in one piece with forked housings 18 at their outer ends. Each forked housing 18 is slightly inclined with respect to the longitudinal axis of the half-axles 14. Each housing 18 has an upper and a lower arm 22, 24 in which an opening 26 is provided to receive a bearing 28. Optionally, the forked housing 18 may be inclined to the front or back, i.e., in a direction transverse to the plane of the drawings.

Figure 2:
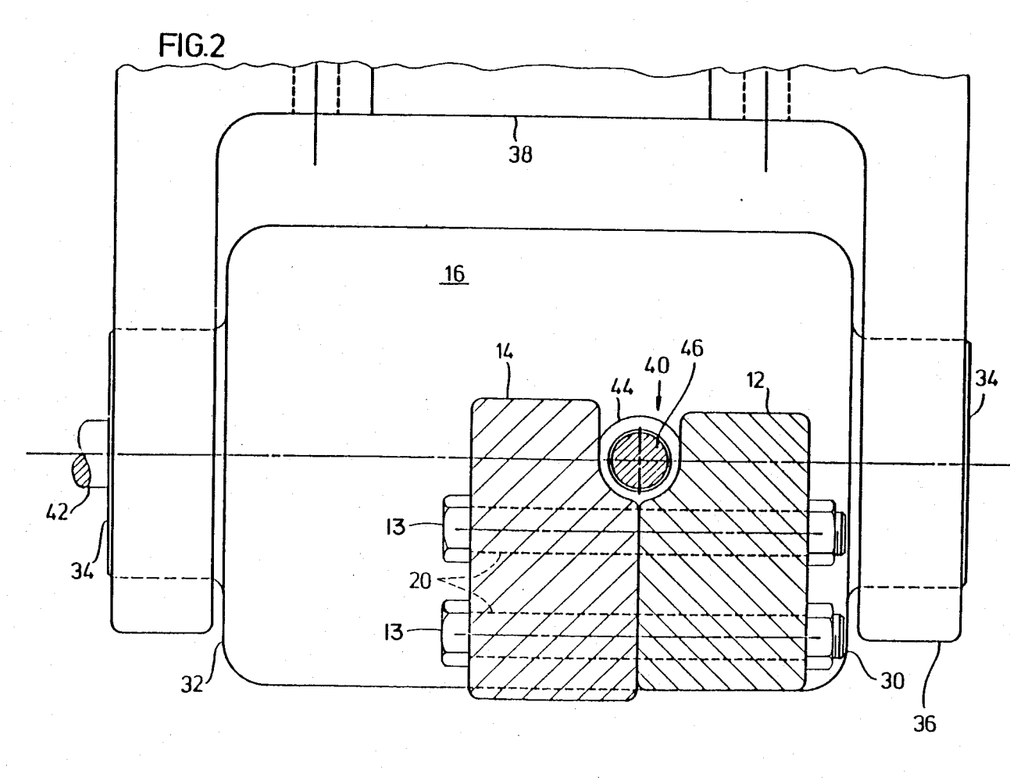
FIG. 2 is a vertical section through the bearing axle along the section line 2—2 in FIG. 1.

The housing 16 has a cast or screwed on trunnion 34 on both its front end face 30 and its rear end face 32 (see FIG. 2). Bearing eyes 36 of a front axle bracket 38 (only partially shown) are pushed onto the trunnions 34 and hold the bearing axle 10 while allowing it to rock or swing as a whole transversely of the direction of travel.

As best seen in FIG. 2, the cross-section of the bridge 12 is generally rectangular and extends sideways from the housing 16. Similarly, the half-axles 14 are generally rectangular. The top portions of the bridge 12 and the half-axles 14 have roughly complementary recessed areas which together produce a recess 40 extending transversely of the direction of travel. This recess 40 may optionally be closed from above by a plate or a cover (not shown) so that dirt cannot drop into the recess 40 and accumulate therein. The lower portions of the half-axles 14 lie flush against the bridge 12 and contain the two rows of bores 20.

Continuing with FIG. 2, a drive shaft 42 extends through the rear trunnion 34 and provides rotary force to the direction-changing gearing disposed in the housing 16. The drive shaft 42 is in driving connection with a transmission and motor vehicle engine via a front wheel drive clutch (not shown). Telescopic input shafts 46 emerge from the side of the housing 16 through bearings 44. The input shafts 46 extend along the recess 40 into the forked housings 18 (see FIG. 1). Rotary force is transmitted to the input shafts 46 from the drive shaft 42 by the direction changing gearing.

Figure 3:
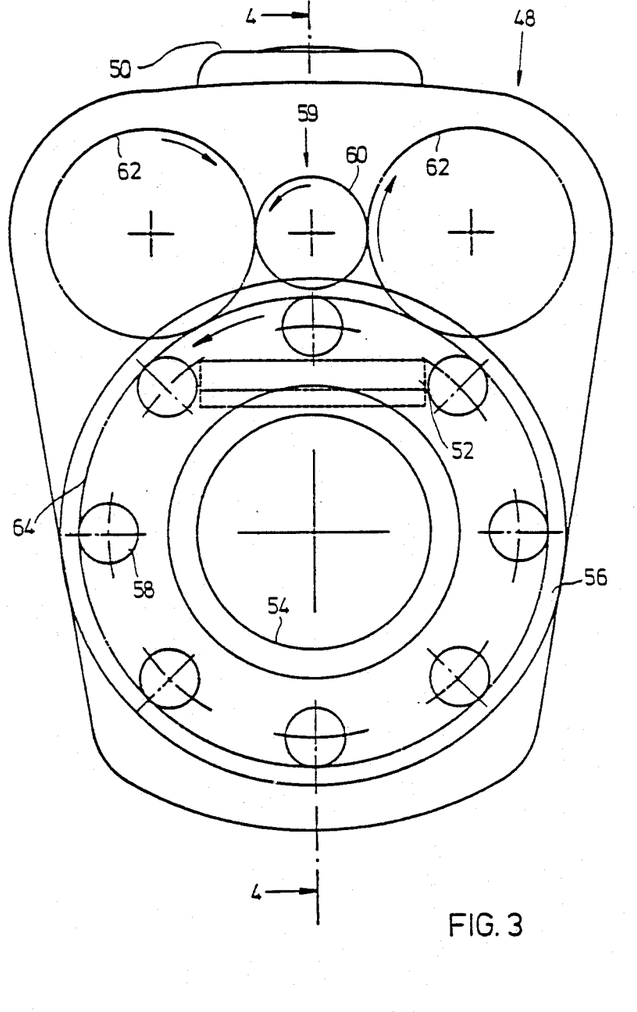
FIG. 3 is an end view of a swivel housing suspended in an articulate, fashion from the bearing axle.
Figure 4:
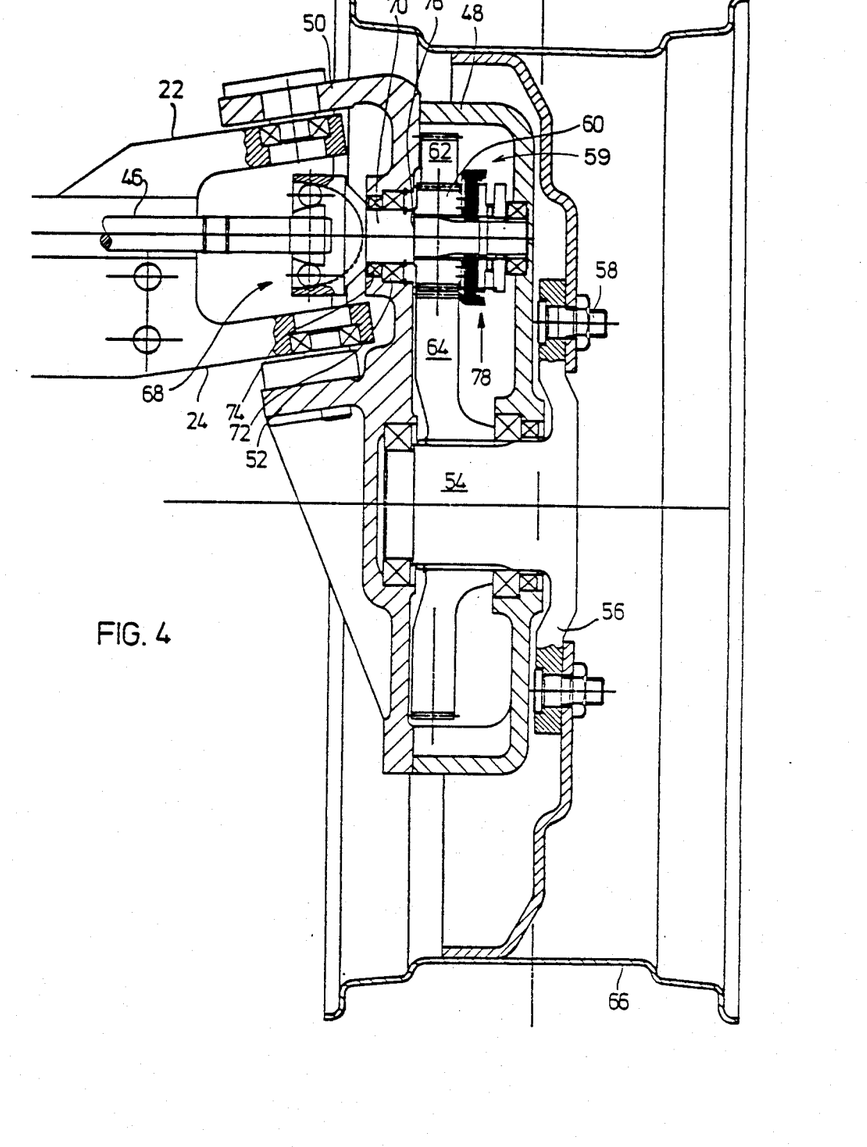
FIG. 4 is a vertical section through the swivel housing along the section line 4—4 in FIG. 3.

Referring to FIGS. 1 and 3, a swivel housing 48 is generally shaped like an upside down trapezoid. An upper and a lower fork arm 50, 52 are mounted on the swivel housing 48, and, optionally, formed in one piece with it. As best seen in FIG. 4, the fork arms 50, 52 are swingably connected to the upper and lower arms 22, 24 of the forked housing 18. Towards the bottom of the swivel housing 48 is a wheel shaft 54 with a flange 56 to which a rim 66 for a tire (not shown) is fixed by means of wheel bolts 58.

Referring to FIGS. 3 and 4, a spur gearing 59 has an input gear 60, two intermediate gears 62 and a driven gear 64, all located in the swivel housing 48. The input gear 60 preferably extends in a floating state into the swivel housing 48 so that it meshes freely with the two intermediate gears 62 to drive them. The two intermediate gears 62 mesh with the driven gear 64, which is mounted for fixed rotation with the wheel shaft 54. The drive can thus be transferred from the input gear 60 to the wheel by way of the intermediate gears 62, the driven gear 64 and the wheel shaft 54. The intermediate gears 62 are mounted in conventional manner (not shown) on axles inserted in the swivel housing 48. The direction arrows shown in FIG. 3 indicate the direction of rotation of the gears 60, 62, and 64 in one direction of travel. In addition to the preferred construction, there are other possible arrangements, for example, a single or direct spur gear stage.

FIG. 4 shows, in vertical section, the accommodation of the input gear 60, the intermediate gears 62 and the driven gear 64 in the swivel housing 48, and also the already described connection of the swivel housing 48 to the forked housing 18. Furthermore, the figure illustrates the connection between the rim 66 and the flange 56 and the spatial relationship of the swivel housing 48 into the interior space of the rim. It is moreover evident from FIG. 4 how the wheel shaft 54 is arranged and mounted.

The end of the input shaft 46 located in the forked housing 18 engages a homokinetic joint 68. The homokinetic joint 68 extends via an input shaft 70 through a bearing 72 and a seat 74 into the swivel housing 48 to hold the input gear 60 in a freely rotating manner. The input shaft 70 is toothed over much of its periphery, but not in the zone for the input gear 60. As shown, the input shaft 46, the homokinetic joint 68 and the input shaft 70 extend into the swivel housing 48 well above the center of the wheel shaft 54 and consequently also of the wheel. Alternatively, the homokinetic joint 68 could be replaced by a double universal joint which allows the same swivelling movement of the swivel housing 48 in the horizontal with respect to the forked housing 18.

Figure 5:
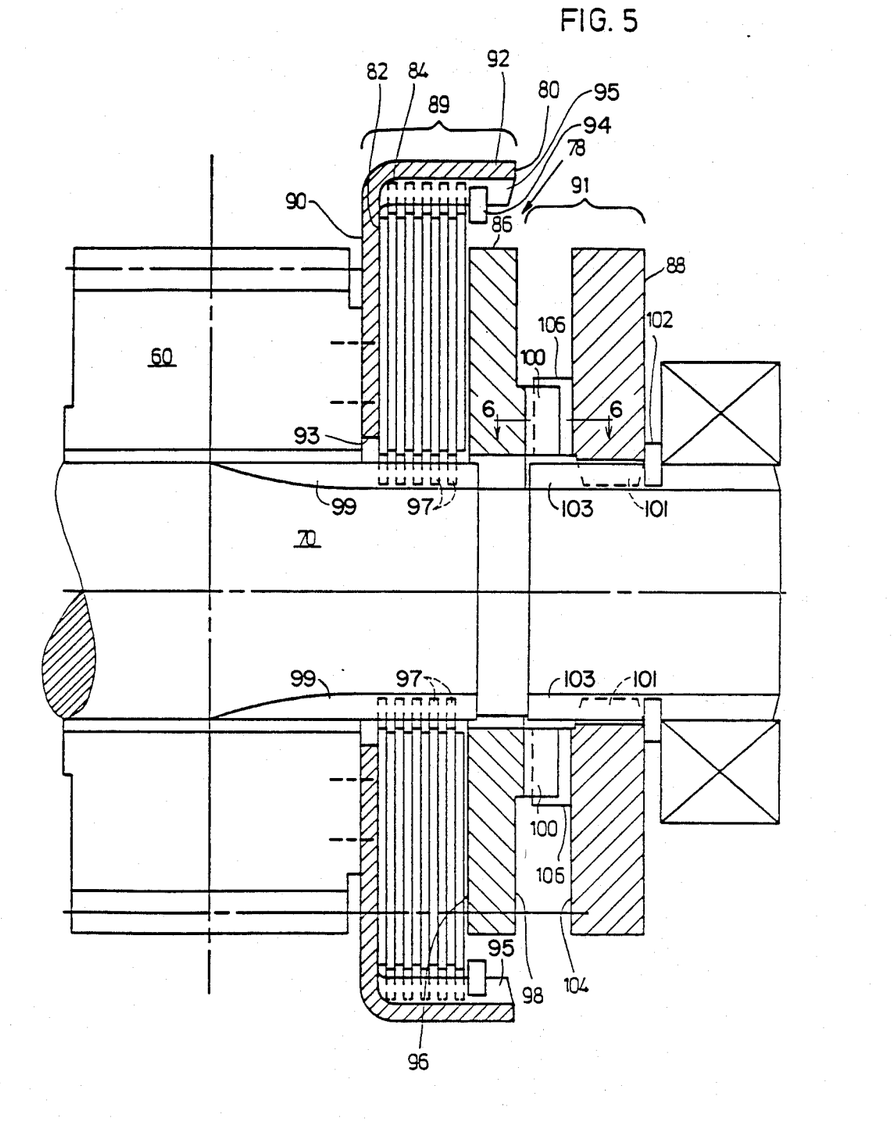
FIG. 5 is a portion of FIG. 4 shown on a larger scale.

Referring to FIG. 5, the periphery of input shaft 70 is plain (not toothed) in the area within the input gear 60. A small annular gap between the inner circumference of the input gear 60 and the shaft 70 allows the gear 60 to slide. This annular gap and the floating mounting of the input gear 60 make possible an exact distribution of the loading on the input gear 60 when driven. The input shaft 70 also has a shoulder 76 (see FIG. 4) limiting axial movement of the input gear 60 towards the homokinetic joint 68. The input shaft 70 itself is fixed in position axially with respect to the swivel housing 48 in conventional manner by means of locking rings which are not described in detail.

Continuing with FIG. 5, a disc type clutch 78 which can be engaged and disengaged in dependence upon torque is provided on the input shaft 70 of each wheel. The clutch 78 has a driven side part 89 and a driving side part 91 and comprises a disc carrier 80, inner discs 82, outer discs 84, a driven side thrust ring 86 and a driving side thrust ring 88. The inner and outer discs 82 and 84 form a disc set 82, 84.

The disc carrier 80 is cup-shaped with a base 90 and a rim 92. The base 90 has a concentric opening 93 to receive the input shaft 70 and is radially and axially immovably connected to the input gear 60, e.g., by a screw connection or soldered joint. At its inner circumference, the rim 92 has teeth 95 to hold the outer discs 84 fast therewith. The teeth 95 have a groove formed towards the outer end of the rim 92 to accommodate a retaining ring 94.

The inner discs 82 also have a central opening, but this opening has teeth 97 at its edge to hold the inner discs 82 rotationally fast to the teeth 99 provided on the periphery of the input shaft 70. As is known, the outer discs 84 and inner discs 82 alternate in the disc carrier 80 so that a rotationally fast connection is produced between the input shaft 70 and the input gear 60 when the inner discs 82 and the outer discs 84 are pressed hard onto one another. Optionally, the outermost disc may be replaced by a pressure or supporting plate, or such a pressure or supporting plate may be inserted between the retaining ring 94 and the outermost disc so that a uniform contact pressure can be applied to the entire disc set 82, 84.

The driven side thrust ring 86 is movable both axially and rotationally with respect to the input shaft 70, and is mounted concentrically surrounding the shaft 70. The left-hand face 96 of the driven side thrust ring 86 is substantially planar and always bears against the outermost disc or against the previously mentioned pressure or supporting plate. The right-hand face 98 of the driven side thrust ring 86 has wedge-shaped teeth 100 extending in the axial direction, as best seen in FIGS. 6, 7, and 8.

The driving side thrust ring 88 also has a central opening with teeth 101 on its edge in mating contact with teeth 103 formed on the periphery of the input shaft 70. A retaining ring 102 is provided on the periphery of the input shaft 70 to the right of the driving side thrust ring 88. The driving side thrust ring 88 is therefore arranged to be immovable rotationally and axially to the right with respect to the input shaft 70. Finally, the left-hand face 104 of the driving side thrust ring 88 has wedge-shaped teeth 106 extending in the axial direction, as best seen in FIGS. 6, 7 and 8.

Figure 6:
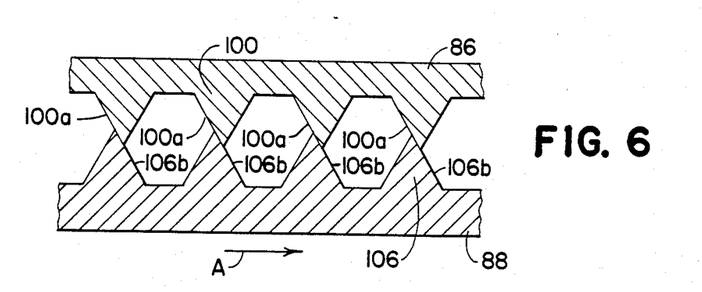
FIGS. 6, 7 and 8 are schematic illustrations of the interactions of the wedge-shaped teeth of the wheel clutches viewed along the line 6—6 in FIG. 5.
Figure 7:
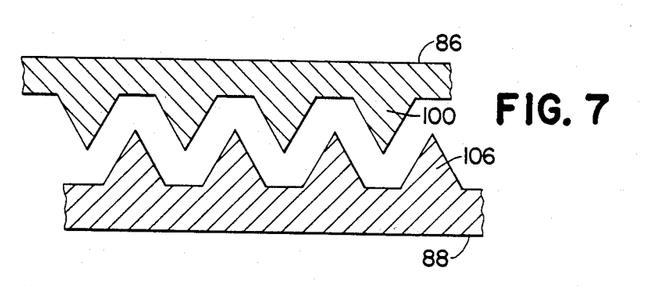
Figure 8:
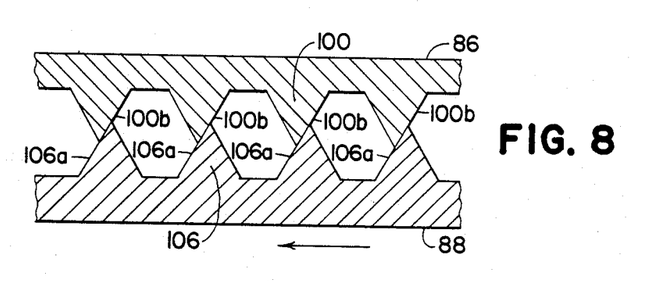

FIGS. 6, 7 and 8 schematically illustrate the interaction of the wedge-shaped teeth 100, 106. For purposes of clarity only, portions of the thrust rings 86, 88 are shown spread out as if they were straight racks of teeth rather than rings of teeth.

The wedge-shaped teeth 100 of the driven side thrust ring 86 and the wedge-shaped teeth 106 of the driving side thrust ring 88 are formed to match one another, with small gaps between each tooth. The driven side thrust ring 86 and the driving side thrust ring 88 are installed in such a manner that they always exert at least a slight bias on the disc set 82, 84 but such that the outer discs 84 and the inner discs 82 can still move against one another in a non-loaded state.

As shown in FIG. 6, when the driven side thrust ring 86 rotates with respect to the driving side thrust ring 88 in the direction of arrow A, the driven side thrust ring 86 is moved axially with respect to the driving side thrust ring 88 by reason of the wedge shape of teeth 100, 106, which contact each other at opposing faces 100a, 106b. Since the driving side thrust ring 88 is held on the right of FIG. 5 (bottom of FIG. 6) by the retaining ring 102, only the driven side thrust ring 86 can move, towards the left of FIG. 5 (top of FIG. 6) against the disc set 82, 84. This increases the contact pressure on the inner and outer discs 82, 84, with the previously described consequences.

For the following description of operation, assume that the drive shaft 42 is driven from the main transmission at a speed at which the wheels connected to the bearing axle 10 have a zero percent lead with respect to the remaining, e.g., rear, wheels. The rotary motion introduced via the drive shaft 42 is directed in the housing 16 to the two input shafts 46 by means of the direction changing gearing, the input shafts 46 being connected to one another so that they are rotationally fast and, consequently, rotating together. If a connection is provided by the clutches 78, the input shafts 46 will transmit the rotary motion imparted to them via the input shafts 70, the clutches 78, the input gears 60, the intermediate gears 62 and the driven gears 64 to the wheel shafts 54 and, consequently, to the wheels. However, assuming travel straight ahead and a slip of zero percent compared to the remaining wheels driven directly by the main transmission, no connection will be provided by the clutches 78 since no relative rotational movement takes place between the driven side thrust ring 86 and the driving side thrust ring 88. This means that the driven side thrust ring 86 is not moved towards the disc set 82, 84 and consequently does not produce any frictional connection between the outer discs 84 and the inner discs 82.

Now, assume travel straight ahead, but with a slip of any magnitude at the driven wheels. The driving side thrust rings 88 now at least briefly rotate more quickly than the driven side thrust rings 86 and the resultant differential speed leads to the opposing faces 100a, 106b moving towards one another and engaging, as shown in FIG. 6. As soon as they abut against one another, the tangential forces are split into axial and radial components in accordance with the slopes of the faces 100a, 106b, and the axial components move the driven side thrust ring 86 axially towards the disc set 82, 84. As a result, the contact pressure on the inner discs 82 and outer discs 84 increases, so that a rotationally fast connection is created between the input shaft 70 and the input gear 60 and the driving line from the driving shaft 42 through to the wheel shafts 54 is completed. The wheels therefore develop traction.

If we now assume travelling around a left-hand bend rather than straight ahead, the right-hand wheel will roll more quickly than the left-hand one. The input gear 60 associated with the right-hand wheel, and therefore the driven side thrust ring 86 associated with that gear, will then lead the driving side thrust ring 88 connected to the input shaft 70. This will separate the corresponding faces 100a, 106b, which will detach the driven side thrust ring 86 from the disc set 82, 84 and terminate the frictional connection, as shown in FIG. 7. The right-hand wheel can therefore roll without receiving any force from the input shaft 70. On the other hand, the left-hand wheel on the inside of the bend rotates at the driving speed, so that a driving connection, such as has been described for travel straight ahead, is maintained at that wheel. This driving connection ensures that the wheel on the inside of the bend contributes traction when the motor vehicle travels around bends. A similar situation arises travelling around a right-hand bend.

In addition, the engine can brake the wheels through the drive train. Upon braking, the input shafts 70 will slow down, but the momentum of the vehicle will cause the driven side thrust rings 86 to lead the driving side thrust rings 88. At first this breaks the frictional connection in the disc set 82, 84, as shown in FIG. 7. With an increasing degree of lead, however, the faces 100b, 106a opposite the previous faces 100a, 106b of the teeth 100, 106 will abut against one another, as shown in FIG. 8. This will again establish a driving connection, but in the opposite direction, with the result that the engine can brake the vehicle through the drive line.

The descriptions of all the above-mentioned situations apply similarly to travel in reverse, irrespective of whether travel in a straight line or travel on a bend is concerned, since the thrust rings 86 and 88 are installed symmetrically.

The track of the bearing axle 10 and of the wheels connected to it can be adjusted simply by releasing the half-axles 14 from the bridge 12 and fixing them in a different, namely the desired, position. Since the input shafts 42 are of telescopic construction, the drive train remains intact. In any track width, the spatial relationship of the rim 66 remains unchanged on the flange 56, and the swivel housing 48 stays situated in the interior space of the rim 66. This means that the track width adjustment in no way impairs ground clearance.

In the foregoing, the nature of the mounting of the swivel housing 48 in the forked housing 18 and the parts required for steering the wheels are not described in detail since these are designed in a conventional manner and are well known to one of ordinary skill in the art.

We claim:

1. A driving arrangement for at least one wheel mounted on a bearing axle of a vehicle body, comprising:
    a driving means;
    a bearing axle having a housing for said driving means, a bridge integrally formed with said housing and pivotally mounted to the vehicle body, and a pair of half-axles, said half-axles being axially adjustably attachable to said bridge in a plurality of positions;
    a swivel housing swivellably mounted at each end of said bearing axle;
    a wheel rotatably supported by each said swivel housing;
    gearing means disposed substantially within each asid swivel housing and drivably connected to the corresponding wheel;
    rotatable telescopic input shafts for drivably coupling the driving means to each of the gearing means; and
    a clutch disposed substantially within each said swivel housing and selectively engaging and disengaging the corresponding input shaft and gearing means depending upon a degree and direction of relative rotation between said input shaft and said wheel.

2. The driving arrangement of claim 1, wherein a plurality of bolt holes are formed in said bridge and a plurality of matching bolt holes are formed in eah of said half-axles, and further comprising at least one bolt extending through corresponding bolt holes in said bridge and each said half-axle to attach said bridge to said half-axle.

3. The driving arrangement of claim 1, wherein said clutch further comprises:
    a driving thrust ring fixed for rotation with said input shaft and having spaced-apart wedge-shaped teeth on one face thereof; and
    a driven thrust ring drivably connectable to said gearing means to drive said wheel and having spaced-apart wedge-shaped teeth engageable with the teeth of said driving ring, said driven ring driving said gearing means whenever the teeth of said rings engage due to relative rotation therebetween.

4. The driving arrangement according to claim 3, wherein said clutch further comprises:
    a plurality of inner discs connected for rotation with said input shaft;
    a plurality of outer discs drivably connected to said gearing means;
    means for limiting motion of said driving ring axially along said input shaft away from said driven ring;
    a clutch base limiting movement of said discs axially along said input shaft, said inner and outer discs being disposed in alternating fashion axially movably along said input shaft between said clutch base and said driven ring.

5. A driving arrangement for a motor vehicle bearing axle having selectively drivable wheels, comprising:
    a track-adjustable bearaing axle having a bridge at a central portion thereof, first and second half-axles each having first and second ends, and a recess formed in an upper portion of at least one of said bridge and said half-axles, each half-axle being axially adjustably attachable to said bridge;

first and second wheels rotatably and swivellably supported at said half-axle second ends, respectively;

first and second rotatable spur gearings at said half-axle second ends, respectively, drivably engageable with said first and second wheels, respectively;

first and second rotatable input shafts drivably engageable with said first and second spur gearings, respectively, each said input shaft being of telescopic construction and extending along said bearing axle in said recess from said central portion towards the corresponding spur gearing;

first and second clutches located at said half-axle second ends, respectively, for selectively engaging and disengaging the corresponding input shaft, spur gearing and wheel depending upon a degree and direction of relative rotation between said input shaft and said wheel;

first and second swivel housing at said half-axle second ends, respectively, each said swivel housing being disposed substantially within the corresponding wheel and substantially enclosing the corresponding spur gearing and clutch; and driving means for rotatably driving each said input shaft at an end thereof towards said cental portion.

6. The driving arrangement of claim 5, wherein each said spur gearing engages the corresponding wheel and each said clutch selectively engages and disengages the corresponding input shaft and spur gearing.

7. The driving arrangement of claim 5, wherein each said spur gearing comprises a driving input gear and a driven gear drivable thereby, said driven gear being fixed for rotation with the corresponding wheel, and wherein each said clutch comprises a driving side part fixed for rotation with the corresponding input shaft and a driven side part fixedly connected for rotation with the corresponding driving input gear.

8. The driving arrangement of claim 7, wherein at least two intermediate gears drivably interconnect each said driving input gear and the corresponding driven gear.

9. The driving arrangement of claim 7 wherein each said driving side part comprises a first thrust ring with a first set of wedge-shaped teeth on a side thereof opposing the corresponding driven side part, and wherein each said driven side part comprises inner discs fixed for rotation with the corresponding input shaft, outer discs fixedly connected for rotation with the corresponding driving input gear and a second thrust ring having a second set of spaced apart wedge-shaped teeth compatible and engageable with the corresponding first set of teeth, said second thrust ring being axially movable along the corresponding input shaft and being pressed against the corresponding inner and outer discs whenever said first and second sets of teeth engage due to relative rotation therebeteween.

10. The driving arrangement of claim 9, wherein each said input shaft further comprises:

a first input shaft portion drivably connected at a first end thereof to said driving means;

a second input shaft portion supporting the corresponding input gear and having the corresponding first thrust ring fixed for rotation therewith at a first end thereof; and a homokinetic joint connecting second ends of said first and second input shaft portions such that rotational energy is transferable therebetween.

11. The driving arrangement of claim 10 wherein each said input gear is freely rotatable around the corresponding second input shaft portion whenever the corresponding clutch is disengaged.

12. A driving arrangement for at least one wheel mounted on a bearing axle, comprising:

a driving means;

a bearing axle having a housing for said driving means, a bridge and a pair of half-axles, said half-axles being axially adjustably attachable to said bridge in a plurality of positions, and a recess formed in upper surfaces of said bridge and said half-axles;

a swivel housing swivellably mounted at each of said bearing axle;

a wheel rotatably supported by each said swivel housing;

gearing means disposed substantially within each said swivel housing and drivably connected to the coresponding wheel;

rotatable telescopic input shafts for drivably coupling the driving means to each of the gearing means; and a clutch disposed substantially within each said swivel housing and selectively engaging and disengaging the corresponding input shaft and gearing means depending upon a degree and direction of relative rotation between said input shaft and said wheel.

* * * * *